United States Patent
Fujiyoshi

[11] Patent Number: 5,875,015
[45] Date of Patent: Feb. 23, 1999

[54] COLOR LIQUID CRYSTAL DISPLAY WHEREIN INTERVALS BETWEEN ADJACENT LINES PASSING ADJACENT PIXELS OF SAME COLOR ARE 260 $\mu$M OR BELOW

[75] Inventor: Tatsumi Fujiyoshi, Miyagi-ken, Japan

[73] Assignee: Frontec Incorporated, Sendai Miyagi, Japan

[21] Appl. No.: 995,607

[22] Filed: Dec. 22, 1997

[30] Foreign Application Priority Data

Dec. 25, 1996 [JP] Japan .................................. 8-346226

[51] Int. Cl.[6] ....................... G02F 1/1343; G02F 1/1335; G09G 3/36

[52] U.S. Cl. ............................. 349/143; 349/106; 345/88; 345/98

[58] Field of Search ................... 349/106, 143; 345/98, 88, 96

[56] References Cited

U.S. PATENT DOCUMENTS

| | | | |
|---|---|---|---|
| 4,855,724 | 8/1989 | Yang | 345/88 |
| 5,041,823 | 8/1991 | Johnson et al. | 340/784 |
| 5,043,917 | 8/1991 | Okamoto | 345/88 |
| 5,253,091 | 10/1993 | Kimura et al. | 359/55 |
| 5,428,366 | 6/1995 | Eichenlaub | 345/102 |
| 5,448,385 | 9/1995 | Deffontaines et al. | 359/59 |
| 5,617,230 | 4/1997 | Ohgawara et al. | 349/143 |
| 5,619,225 | 4/1997 | Hashimoto | 345/98 |
| 5,689,283 | 11/1997 | Shirochi | 345/88 |

FOREIGN PATENT DOCUMENTS

08086998  4/1996  Japan .

*Primary Examiner*—William L. Sikes
*Assistant Examiner*—Tarifur R. Chowdhury
*Attorney, Agent, or Firm*—Brinks Hofer Gilson & Lione

[57] ABSTRACT

A color liquid crystal display comprises pixels for a plurality of basic colors arranged in a cyclic two-dimensional arrangement. Intervals between adjacent ones of a plurality of lines passing the adjacent pixels of the same basic color driven by driving voltages of the same polarity are 260 $\mu$m or below.

3 Claims, 8 Drawing Sheets

SIZE OF PIXEL

→ SCANNING LINE

+ − POLARITY OF DRIVING VOLTAGE

260 μm OR BELOW

SIZE OF PIXEL

FIG. 3

→ SCANNING LINE

+— POLARITY OF DRIVING VOLTAGE

SIZE OF PIXEL

FIG. 4

PRIOR ART
FIG. 5A
FIRST FIELD

PRIOR ART
FIG. 5B
SECOND FIELD

PRIOR ART
FIG. 5C
THIRD FIELD

PRIOR ART
FIG. 5D
FOURTH FIELD

☐ POSITIVE DRIVING VOLTAGE
△ NEGATIVE DRIVING VOLTAGE
→ SCANNING LINE

PRIOR ART

FIG. 6

PRIOR ART

FIG. 7

AC DRIVE
VOLTAGE
WAVEFORM

PRIOR ART

FIG. 9

COLOR LIQUID CRYSTAL DISPLAY WHEREIN INTERVALS BETWEEN ADJACENT LINES PASSING ADJACENT PIXELS OF SAME COLOR ARE 260 µM OR BELOW

BACKGROUND OF THE INVENTION

The present invention relates to a color liquid crystal display capable of being driven by an interlace drive system.

Liquid crystal displays are utilized for various purposes for their compactness and ability to function at low power consumption. Recently, various color liquid crystal displays capable of displaying color pictures in a high picture quality have been proposed.

Liquid crystal displays are driven by the interlace drive system or the noninterlace drive system. The noninterlace drive system scans sequentially rows of pixels arranged in a matrix one at a time. The interlace drive system scans every other row of pixels, i.e., odd rows of pixels in a field first, and then even rows of pixels of the same field.

The frequency of driving of pixels in unit time by the interlace drive system is half that of driving of pixels in unit time by the noninterlace drive system, and hence the interlace drive system enables the liquid crystal display at a low power consumption. However, if the pixels of an NTSC TV monitor employing a liquid crystal display panel are driven by the interlace drive system, the so-called line crawling, i.e., visual disturbance on a TV screen in which line crawling occurs on the TV screen, is liable to occur to deteriorate picture quality. The followings are possible causes of line crawling on a liquid crystal display panel driven by the interlace drive system.

(1) Usually, liquid crystal pixels are driven by a.c. power. Referring to FIGS. 5A to 5D illustrating the interlace drive system which drives pixels by a.c. power, pixels on every other row are scanned in each field; i.e., pixels on odd rows are scanned in odd fields, and pixels on even rows are scanned in even fields. Rows to be driven are changed between the fields. In FIGS. 5A to 5D, R, G and B indicate red, green, and blue pixels, respectively, a square (□) indicates a pixel to which a positive driving voltage is applied, and a triangle (Δ) indicates a pixel to which a negative voltage is applied. It is noted from the observation of pixels of the same color on each row that pixels driven by a positive driving voltage and those driven by a negative voltage are arranged alternately. In FIGS. 5A to 5D, each of oblique lines passes adjacent green pixels G in each field driven by a positive driving voltage.

Each pixel has an optical characteristic expressed by an even function of the driving voltage; that is, the optical characteristic of each pixel is dependent on the absolute value of the amplitude of the driving voltage applied to the pixel. Therefore, the absolute value of the positive driving voltage to be applied to the pixel and that of the negative driving voltage to be applied to the same pixel must be equal to each other to keep constant the brightness of the pixel.

Figure 6:
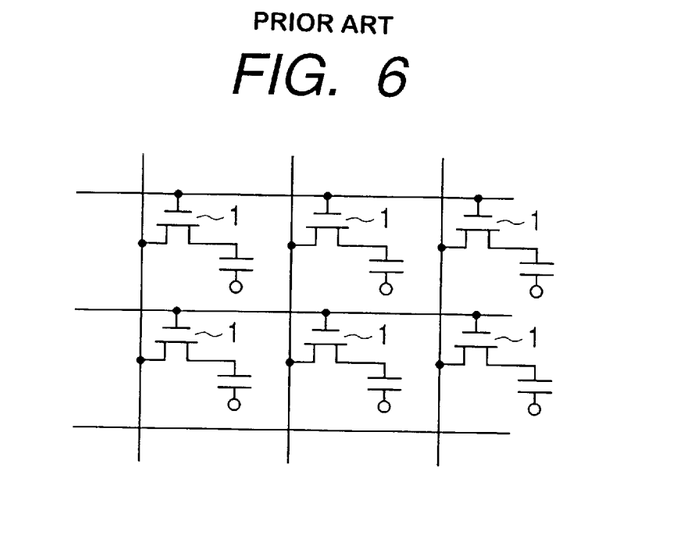
FIG. 6 is a diagrammatic view of an active matrix color liquid crystal display.
Figure 7:
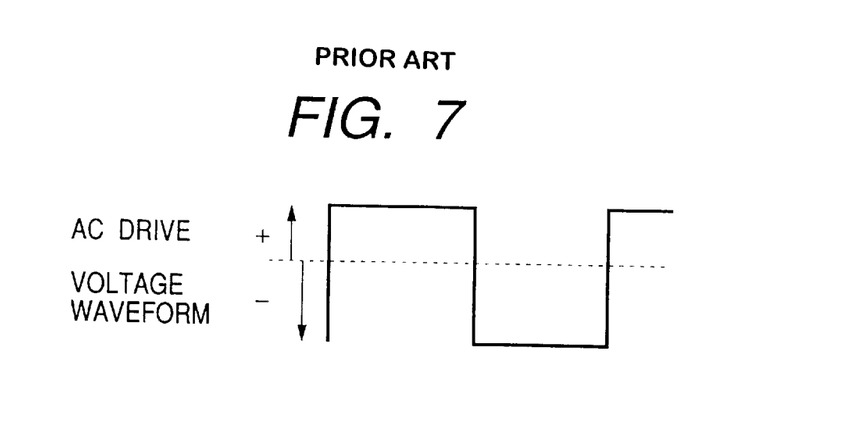
FIG. 7 is a waveform chart of a driving voltage for driving the pixels of the color liquid crystal display of FIG. 6.

However, a d.c. offset voltage is applied inevitably to the pixel in addition to an a.c. driving voltage as shown in FIG. 7 due to the characteristics of the device when the liquid crystal display employs TFTs (thin-film transistors) as shown in FIG. 6. Consequently, the transmittance of each pixel varies in a frequency half the pixel driving frequency, so that the brightness of the pixel varies and the pixel flickers. The pixel driving frequency of the noninterlace drive system is 60 Hz and the pixel driving frequency of the interlace drive system is 30 Hz. The flickering frequency therefore is 30 Hz for the noninterlace drive system and 15 Hz for the interlace drive system. Human visual sensitivity with a flicker increases with the decrease of the frequency of the flicker. Therefore, flickers that occur when the liquid crystal display is driven by the interlace drive system is more visually recognizable than flickers that occur when the liquid crystal display is driven by the noninterlace drive system.

Figure 5A:
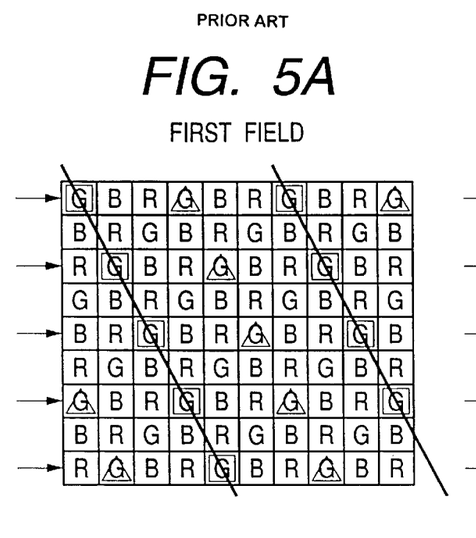
FIGS. 5A, 5B, 5C and 5D are diagrammatic views of assistance in explaining causes of line crawling when a liquid crystal display is driven by the interlace drive system.
Figure 5B:
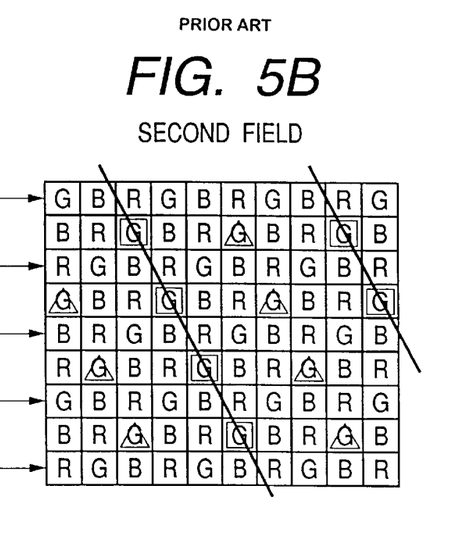
Figure 5C:
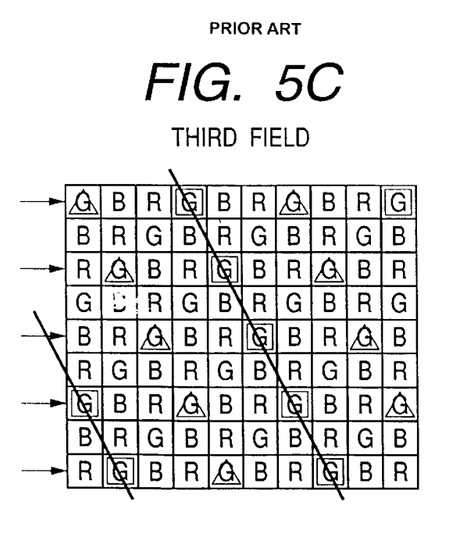
Figure 5D:
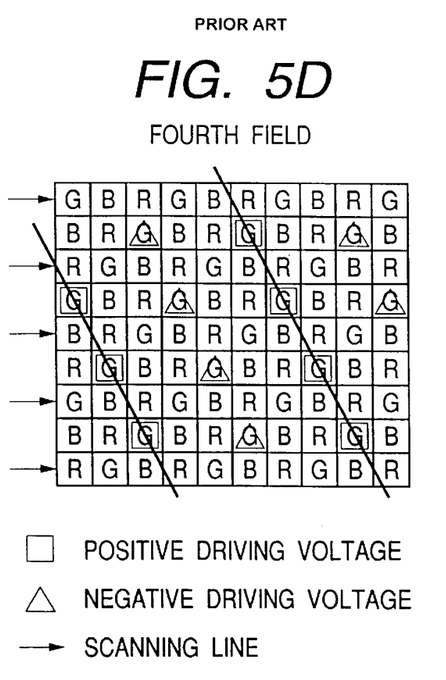

If the variation of the transmittance with time is easily visually recognizable, the variation of the same in space also is easily visually recognizable, so that line crawling occurs. For example, the pixels G on oblique lines in the first field shown in FIG. 5A are driven by a positive driving voltage, and the same pixels G in the third field shown in FIG. 5C are driven by a negative driving voltage. Therefore, if a d.c. offset is superposed on the a.c. driving voltage and the absolute value of the positive driving voltage is greater than that of the negative driving voltage, the pixels on the oblique lines are bright in the first field shown in FIG. 5A and are darker in the third field than those in the first field. If flicker is viewed in a space, the oblique lines shown in FIGS. 5A to 5D flicker, causing line crawling.

(2) The amplitude of a flicker which occurs when the liquid crystal display is driven by the interlace drive system is greater than that of a flicker which occurs when the liquid crystal display is driven by the noninterlace drive system because of the following reasons.

Figure 8A:
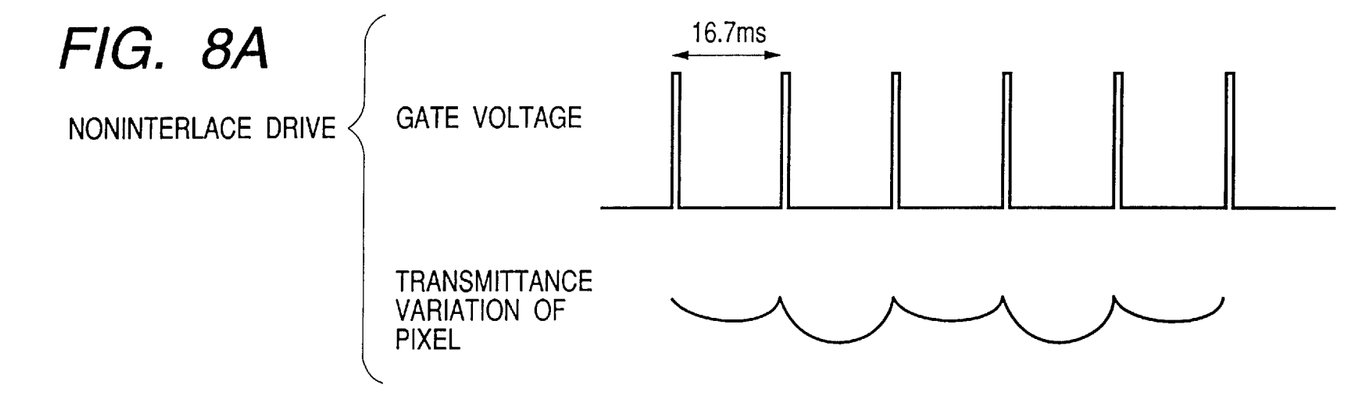
FIGS. 8A and 8B are diagrams showing the waveforms of gate voltages applied to the gates of TFTs included in the color liquid crystal display of FIG. 6 and the mode of periodic variation of the transmittance of a pixel.
Figure 8B:
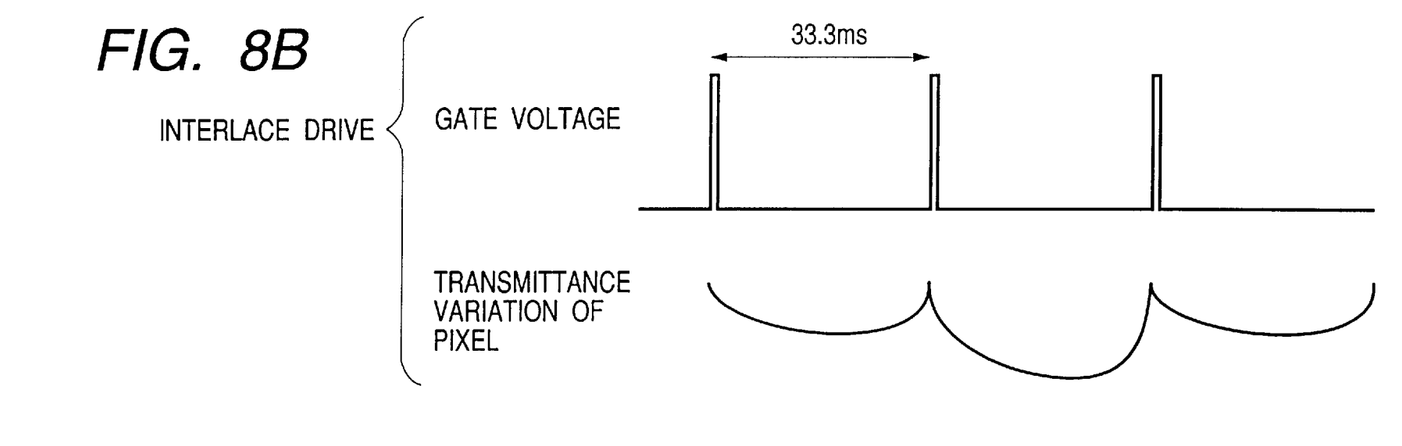
Figure 9:
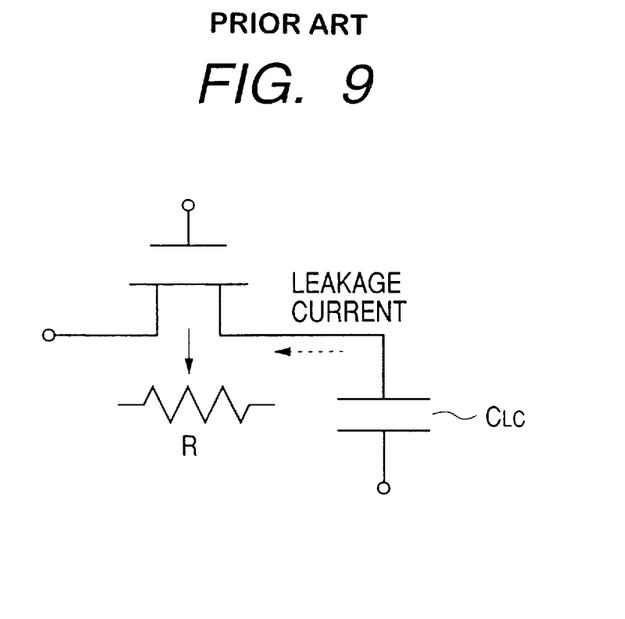
FIG. 9 is a diagram of assistance in explaining a leakage current which flows through the TFT of the color liquid crystal display of FIG. 6.

When a liquid crystal display as shown in FIG. 6 is driven by the noninterlace drive system, a gate voltage of 16.7 ms in period as shown in FIG. 8A is applied to the TFT1 of each pixel. The voltage holding time of the pixel, therefore, is 16.7 ms when the liquid crystal display is driven by the noninterlace drive system. When the liquid crystal display is driven by the interlace drive system, a gate voltage is applied to the TFT of each pixel at a period of 33.3 ms as shown in FIG. 8B and hence the voltage holding time of each pixel is 33.3 ms.

A leakage current flows through a leakage resistor R even while the TFT employed in the liquid crystal display is in an OFF state. The quantity of charges discharged by a liquid crystal capacitor $C_{LC}$ when the liquid crystal display is driven by the interlace drive system is greater than that when the liquid crystal display is driven by the noninterlace drive system. Therefore, as shown in FIGS. 8A and 8B, the amplitude of the flicker when the liquid crystal display is driven by the interlace drive system is greater than that when the liquid crystal display is driven by the noninterlace drive system.

As is apparent from the foregoing description, the frequency and the amplitude of the flicker in a liquid crystal display driven by the interlace drive system, as compared with those of the flicker in a liquid crystal display driven by the noninterlace drive system, is disadvantageous in respect of visual characteristics. Therefore, the interlace drive system employs an inverting drive system, such as a pixel inverting drive system, to deal with flickers of the same phase on the screen. However, the problem relating to deterioration of the picture quality by line crawling has not been solved yet.

SUMMARY OF THE INVENTION

Accordingly, it is an object of the present invention to provide a color liquid crystal display capable of making line crawling hardly visible even if the color liquid crystal display is driven by the interlace drive system.

According to one aspect of the present invention, a color liquid crystal display comprises pixels for a plurality of basic colors arranged in acyclic two-dimensional arrangement, in which intervals between adjacent ones of a plurality of lines passing the adjacent pixels of the same basic color driven by driving voltages of the same polarity are 260 µm or below.

The basic colors may be three colors for three-color display of the RGB additive color mixture system.

The basic colors may be two colors for two-color display of the MCY subtractive color mixture system.

According to the present invention, line crawling is invisible even if the spatial periodic variation of the transmittance of each pixel forming a screen is caused by asymmetric positive and negative pixel driving voltages. It is because the period of the variation is 260 µm or below.

BRIEF DESCRIPTION OF THE DRAWINGS

The above and other objects, features, and advantages of the present invention will become more apparent from the following description taken in connection with the accompanying drawings, in which.

DETAILED DESCRIPTION OF THE PREFERRED EMBODIMENTS

Line crawling is caused by the foregoing causes. The following means may be effective in preventing line crawling.

Means 1: Use of a driving voltage of a high frequency

Means 2: Suppression of the variation of the transmittance of each pixel.

Image signals are transmitted to a liquid crystal display employed in a TV set according to a predetermined timing method specified by, for example, the NTSC system. Accordingly, the field frequency for displaying pictures on a liquid crystal display is set at a frequency unique to the image signal transmission system. Therefore, if the means (1) is taken, a field frequency higher than a frequency unique to the image signal transmission system is used through scan conversion using an image memory or the like. The means (1), however, increases the cost and size of the liquid crystal display and hence the means (1) is not suitable for preventing line crawling.

The suppression of the variation of the transmittance of each pixel below a level which makes visual recognition of line crawling difficult by means 2 is accompanied by various difficulties from the view point of the characteristics of the device and its productivity. It is therefore not desirable to employ means (2) haphazardly, either.

Quantitative conditions for preventing line crawling were determined through line crawling visibility experiments based on the following guideline to suppress line crawling, allowing the variation of the transmittance of each pixel to some extent and without changing driving frequency.

Guideline: Line crawling is made visually unrecognizable by increasing the spatial frequency fixed by the arrangement of the color pixels of a color liquid crystal display, driving voltage inverting system, and the density of the pixels.

This guideline intends to use human visual sensitivity. It is generally known that the higher is the space-time frequency of the flicker, the lower is the sensitivity of human visual sensation to a flicker (Refer to, for example, "Shikaku no Shikido no Jikukan Shuhasu Tokusei", Denshi Tsushin Gakkai Ronbun-shi, Vol. J63-A, No. 12, December '80). The present invention utilizes this known characteristic of human visual sensation. As mentioned above, the driving frequency (time frequency) of the driving voltage for driving the pixels cannot be changed. However, it must be possible to reduce the sensitivity of human visual sensation to a flicker by raising only spatial frequency. The inventors of the present invention manufactured color liquid crystal displays of different descriptions on a trial basis and examined the picture displaying performance of the color liquid crystal displays to determine a spatial frequency which makes line crawling visually unrecognizable.

Figure 1A:
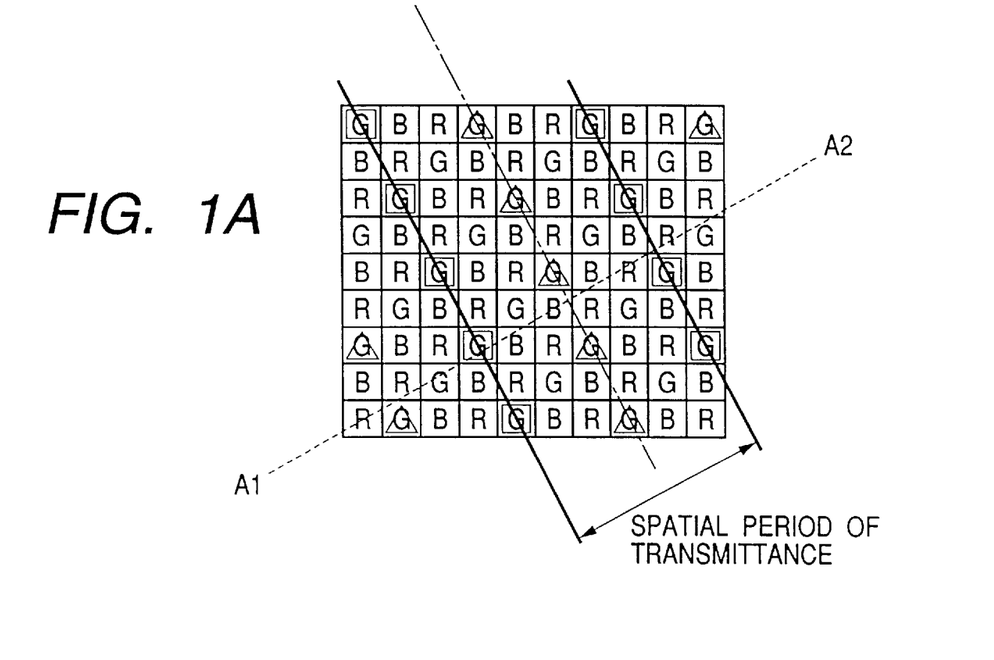
FIGS. 1A and 1B are diagrammatic views of assistance in explaining the basic principle of the present invention.

FIG. 1A shows a pixel matrix included in a color liquid crystal display manufactured on a trial basis by the inventors of the present invention, in which R, G, and B indicate red, green and, blue pixels, respectively, a square (□)indicates a pixel to which a positive driving voltage is applied, and a triangle (Δ) indicates a pixel to which a negative voltage is applied. In FIG. 1A, an oblique alternate long and short dash line passes adjacent green pixels G driven by a negative driving voltage, and two oblique solid lines on the opposite sides of the oblique alternate long and short dash line pass adjacent green pixels G driven by a positive driving voltage.

Figure 1B:
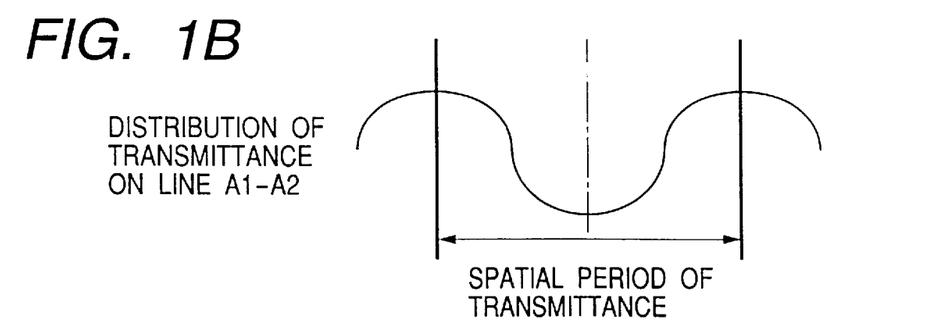

FIG. 1B shows the distribution of transmittance on a line A1–A2. Since the pixels on the two oblique solid lines are driven by a positive driving voltage, the transmittances of those pixels are the same as shown in FIG. 1B. Since the pixels on the oblique long and short dash line are driven by a negative driving voltage, the transmittances of those pixels are different from those of the pixels on the oblique solid lines. Therefore, the distribution of transmittance on the line A1–A2 assumes a spatial periodic curve of a period corresponding to a section between the oblique solid lines.

The inventors of the present invention manufactured experimental color liquid crystal displays differing from each other in the spatial period of transmittance variation, i.e., the distance between the two oblique solid lines in FIG. 1A, and operated the same for experiments. The screens of the experimental color liquid crystal displays in operation were observed from a position at 30 cm therefrom to evaluate the displaying performance of the experimental color liquid crystal displays. Green pixels G which give high visual sensitivity and have transmittance varying in the widest range of variation were used to evaluate the displaying performance, and the screens were examined to see whether or not any line crawling was visually recognizable. It was found through the experimental operation of the experimental color liquid crystal displays that no visually recognizable line crawling occurred if the spatial period of transmittance variation represented by the interval between the two oblique solid lines was 260 µm or below.

Figure 2:
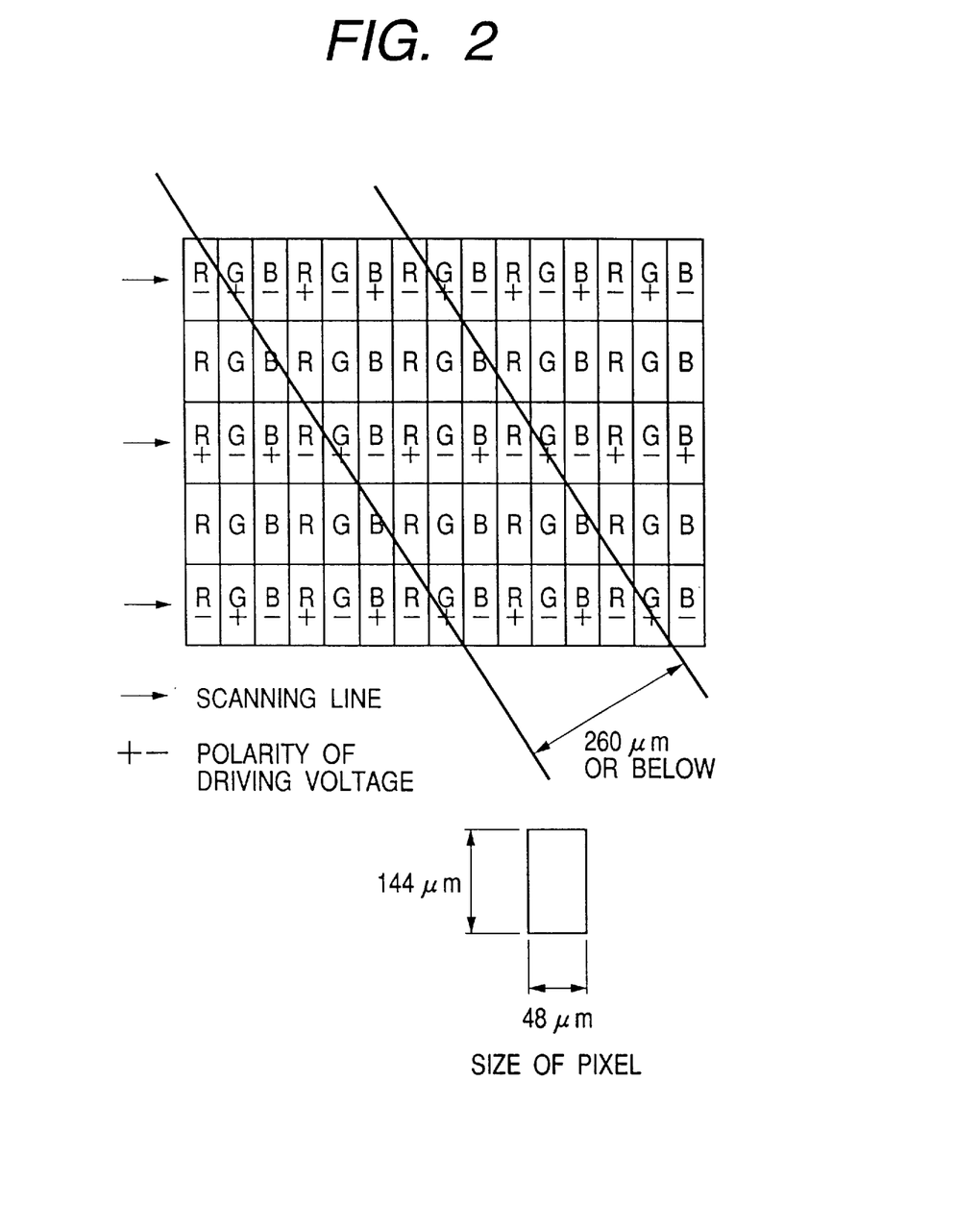
FIG. 2 is a diagrammatic view of the pixel matrix of a color liquid crystal display in a first embodiment according to the present invention.
Figure 3:
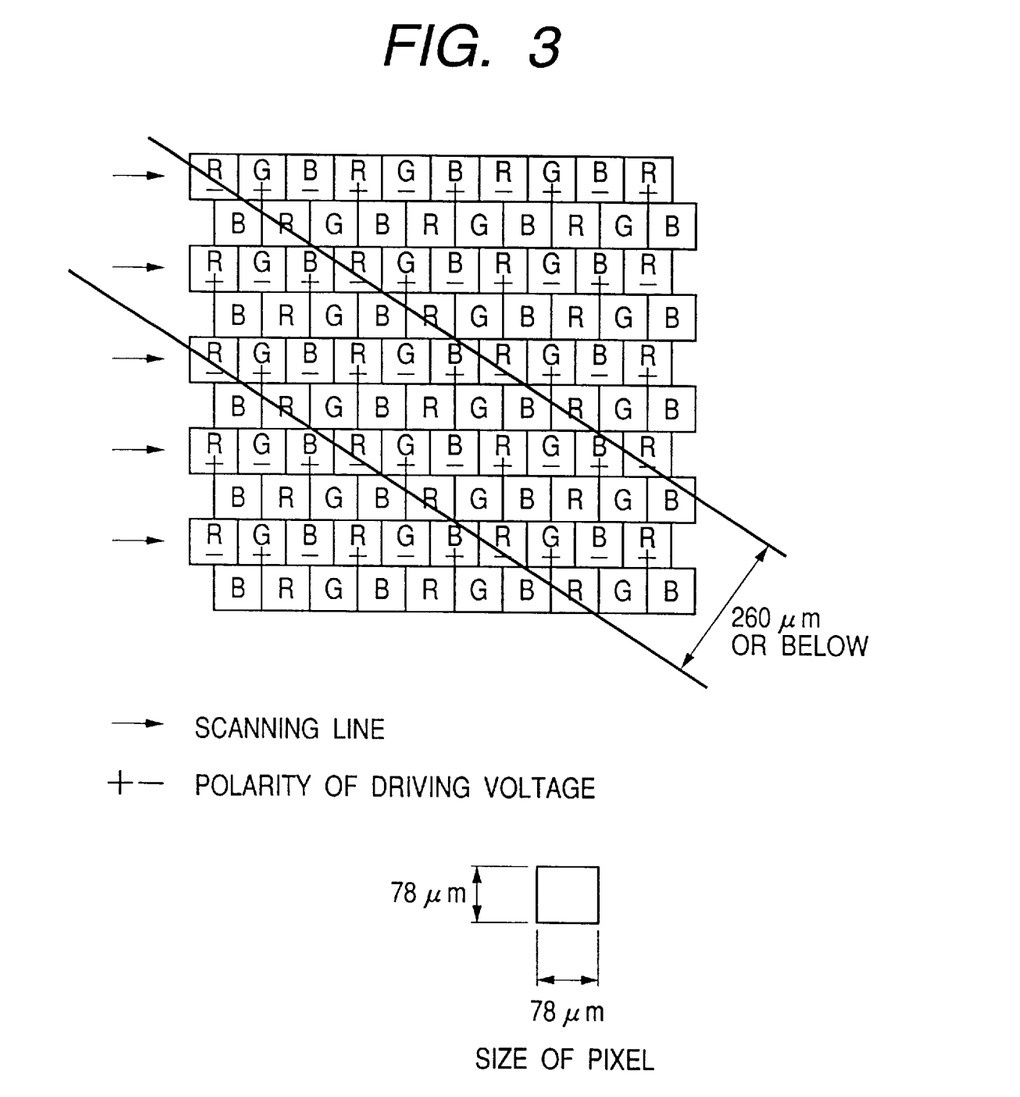
FIG. 3 is a diagrammatic view of the pixel matrix of a color liquid crystal display in a second embodiment according to the present invention.
Figure 4:
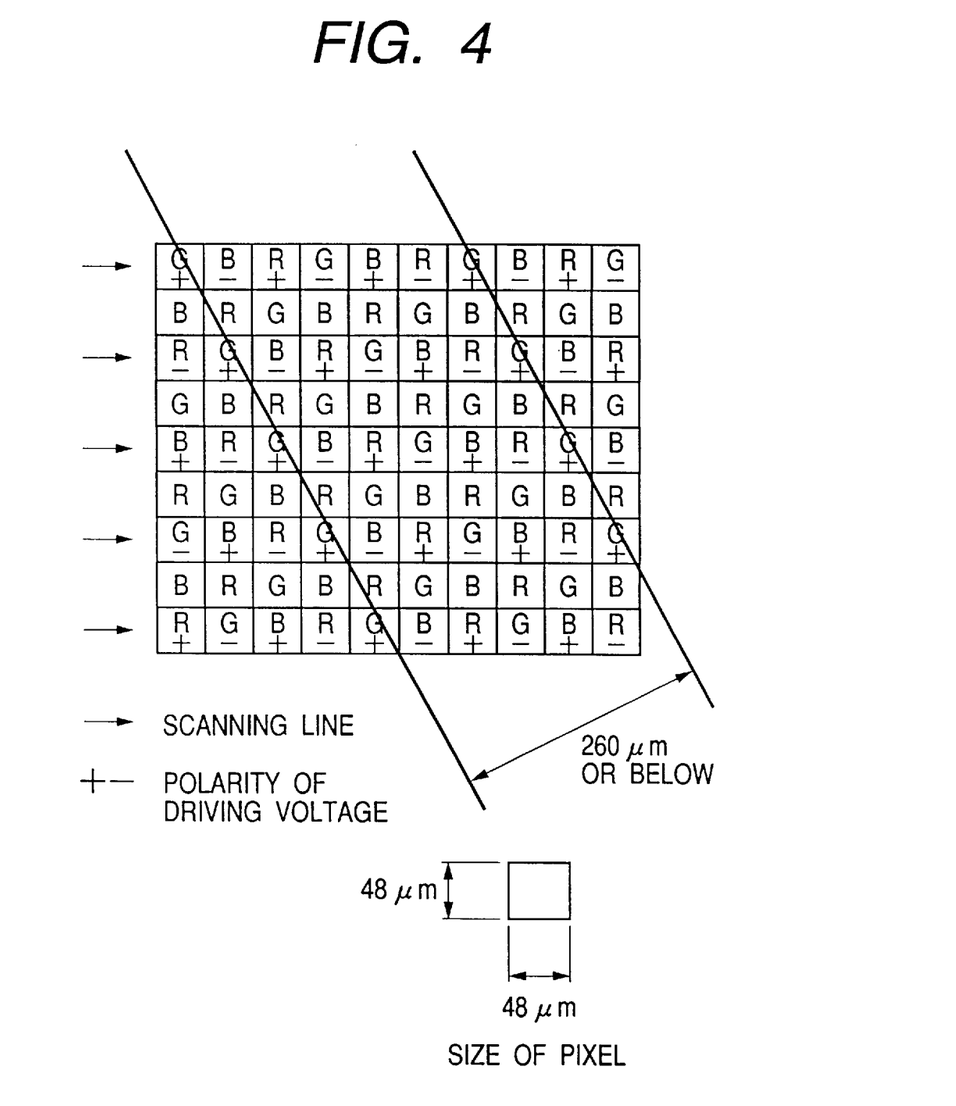
FIG. 4 is a diagrammatic view of the pixel matrix of a color liquid crystal display in a third embodiment according to the present invention.

FIGS. 2 to 4 show color liquid crystal displays in preferred embodiments according to the present invention designed on the basis of the fact found through the foregoing experiments. The color liquid crystal display of FIG. 2 has color pixels arranged in a color stripe arrangement, the color liquid crystal display of FIG. 3 has color pixels arranged in a delta color arrangement, and the color liquid crystal display of FIG. 4 has color pixels arranged in an oblique mosaic color arrangement. All those color liquid crystal displays are of a pixel inversion drive system. The spatial periods of transmittance variation of those color liquid crystal displays are 260 µm or below. Experimental operation of those color liquid crystal displays embodying the present invention proves that spatial period of transmittance variation of 260 µm or below prevents the occurrence of visually recognizable line crawling and enables displaying pictures in a high picture quality.

Although the foregoing embodiments of the present invention employ the pixel inversion drive system, and have the color pixels arranged in the color stripe arrangement, the delta color arrangement, and the oblique mosaic color arrangement, respectively, many changes and variations can be made in the embodiments. Although the invention has been described as applied to color liquid crystal displays using three colors for three-color display of the RGB additive color mixture system, the present invention is also applicable to color liquid crystal displays using two colors for two-color display of the MCY subtractive color mixture system.

As is apparent from the foregoing description, according to the present invention, line crawling is invisible even if the spatial periodic variation of the transmittance of each pixel forming a screen is caused by asymmetric positive and negative pixel driving voltages because the period of the variation is 260 µm or below, and pictures can be displayed in a high picture quality.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A color liquid crystal display comprising pixels for a plurality of basic colors arranged in a cyclic two-dimensional arrangement, wherein intervals between adjacent ones of a plurality of lines passing the adjacent pixels of the same basic color driven by driving voltages of same polarity are 260 µm or below.

2. A color liquid crystal display according to claim 1, wherein the basic colors are three colors for three-color display of RGB additive color mixture system.

3. A color liquid crystal display according to claim 1, wherein the basic colors are two colors for two-color display of MCY subtractive color mixture system.

* * * * *